(12) United States Patent
Mouleyre et al.

(10) Patent No.: US 10,875,505 B2
(45) Date of Patent: Dec. 29, 2020

(54) CONTROLLED SYSTEM FOR WIPING AND WASHING A VEHICLE WINDOW, WINDSCREEN WIPER, WINDSCREEN WIPER BLADE AND METHOD OF EQUIPPING A VEHICLE

(71) Applicant: Valeo Systèmes d'Essuyage, Le Mesnil Saint Denis (FR)

(72) Inventors: Guillaume Mouleyre, Issoire (FR); William Terrasse, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 232 days.

(21) Appl. No.: 16/021,737

(22) Filed: Jun. 28, 2018

(65) Prior Publication Data

US 2019/0001929 A1    Jan. 3, 2019

(30) Foreign Application Priority Data

Jun. 29, 2017   (FR) ...................................... 17 56015

(51) Int. Cl.
*B60S 1/52* (2006.01)
*B60S 1/48* (2006.01)
*B60S 1/34* (2006.01)

(52) U.S. Cl.
CPC ............... *B60S 1/528* (2013.01); *B60S 1/482* (2013.01); *B60S 1/524* (2013.01); *B60S 1/526* (2013.01); *B60S 1/3415* (2013.01)

(58) Field of Classification Search
CPC .......... B60S 1/522; B60S 1/524; B60S 1/528; B60S 1/526; B60S 1/52; B60S 1/38; B60S 1/34; B60S 1/3415; B60S 1/482
(Continued)

(56) References Cited

U.S. PATENT DOCUMENTS

2008/0083081 A1*   4/2008   Rhodes ................. B60S 1/3415
                                                                 15/250.02
2012/0297564 A1*   11/2012  Jeuffe ..................... B60S 1/524
                                                                 15/250.04
(Continued)

FOREIGN PATENT DOCUMENTS

EP         1614594 A2    1/2006
EP         3002169 A1    4/2016
FR         2 916 716 A1   12/2008

OTHER PUBLICATIONS

Preliminary Search Report and Written Opinion issued in corresponding French Application No. 1756015, dated Feb. 21, 2018 (7 pages).

*Primary Examiner* — Gary K. Graham
(74) *Attorney, Agent, or Firm* — Osha Bergman Watanabe & Burton LLP

(57) ABSTRACT

The invention proposes a system (10) for wiping a vehicle window (12), comprising:
at least one windscreen wiper blade (14) adapted to be driven by a drive arm (16) of the wiper system (10) with alternating movements sweeping at least one portion of the exterior surface of a window to be wiped between two positions at which the sweeping direction is reversed;
a device (18) for spraying a liquid onto the exterior surface;
a pump for feeding the sprayer device (18) with liquid;
a circuit (CP) for controlling the feeding of the sprayer device (18) by the pump (38) as a function of the sweeping direction,
characterized in that it includes a sensor (CA) of acceleration of the windscreen wiper that is carried by the windscreen wiper and that is connected to the control circuit (CP) in order to supply to the control circuit
(Continued)

(CP) signals representing the value of the acceleration of the windscreen wiper (11).

12 Claims, 4 Drawing Sheets

(58) Field of Classification Search
USPC ........ 15/250.04, 250.02, 250.351; 239/284.1
See application file for complete search history.

(56) References Cited

U.S. PATENT DOCUMENTS

2016/0250997 A1* 9/2016 Toda ..................... B60S 1/0807
  701/49
2019/0329735 A1* 10/2019 Iwasaki ................. B60S 1/0807

* cited by examiner

CONTROLLED SYSTEM FOR WIPING AND WASHING A VEHICLE WINDOW, WINDSCREEN WIPER, WINDSCREEN WIPER BLADE AND METHOD OF EQUIPPING A VEHICLE

TECHNICAL FIELD OF THE INVENTION

The invention concerns a system for wiping a motor vehicle window including a windscreen wiper blade and a device for spraying a liquid onto the exterior surface of the window.

The invention also proposes a method of modifying the equipment of a motor vehicle provided with a wiping and washing system.

TECHNICAL BACKGROUND OF THE INVENTION

It is desirable to be able to control the spraying of the exterior surface of a window to be wiped, and notably of a windscreen in such a manner that liquid, for example washing liquid, is sprayed only during the upward outward phase of a windscreen wiper blade that is adapted to wipe the zone of the windscreen onto which the liquid is sprayed, and notably in order not to spray liquid degrading visibility during the downward return phase.

An object of the invention is to propose a solution founded on the detection of the reversing of the sweeping direction that can notably be implemented for equipping a vehicle with wipers equipped with liquid sprayer devices replacing conventional windscreen wiper blades.

BRIEF SUMMARY OF THE INVENTION

The invention proposes a wiper system a vehicle window, comprising:
  at least one windscreen wiper blade adapted to be driven by a drive arm of the wiper system with alternating movements sweeping at least one portion of the exterior surface of a window to be wiped between two positions at which the sweeping direction is reversed;
  a device for spraying a liquid onto the exterior surface;
  a pump for feeding the sprayer device with liquid;
  a circuit for controlling the feeding of the sprayer device by the pump as a function of the sweeping direction,
  characterized in that it includes a sensor of acceleration of the windscreen wiper that is carried by the drive arm or by the windscreen wiper blade and that is connected to the control circuit in order to supply to the control circuit signals representing the value of the acceleration of the drive arm or of the windscreen wiper blade of the windscreen wiper during the alternating sweeping movements.
  According to other features of the wiper system:
  the control circuit includes means for analysis of the signals supplied by the acceleration sensor to detect the reversing of the sweeping direction of the windscreen wiper;
  the windscreen wiper includes a windscreen wiper blade and an arm for driving the windscreen wiper blade in alternating sweeping movements, and in that the acceleration sensor is carried by the windscreen wiper blade or by the windscreen wiper blade;
  the sprayer device is configured to spray liquid along a lateral face of the blade;
  the sprayer device is carried by the windscreen wiper blade or by the drive arm;
  the control circuit is carried by the windscreen wiper blade or by the drive arm, and the sprayer device is configured to spray the windscreen along a lateral face of the wiper;
  the feed pump is controlled by the control circuit;
  the wiper system includes a relay for controlling the supply of electrical energy to a feed pump drive motor connected to the control circuit.

The invention also proposes a windscreen wiper of a motor vehicle window, characterized in that it carries:
  a sensor of acceleration of the windscreen wiper;
  a circuit for controlling the feeding of a device for spraying liquid onto the window with liquid,
  and in that the acceleration sensor is connected to the control circuit.
  According to other features of the windscreen wiper:
  it includes a windscreen wiper blade and an arm for driving alternating sweeping movements of the windscreen wiper blade, and the acceleration sensor and the control circuit are carried by the windscreen wiper blade;
  the sprayer device is carried by the windscreen wiper blade.

The invention further proposes motor vehicle windscreen wiper blade, characterized in that it carries:
  a sensor of acceleration of the windscreen wiper;
  a circuit for controlling the feeding of a device for spraying liquid onto the window with liquid,
  and in that the acceleration sensor is connected to the control circuit.

The sprayer device is for example carried by the windscreen wiper blade.

The invention further proposes a method for modification of the equipment of a motor vehicle provided with a wiper system a window of the vehicle comprising:
  at least one arm for driving a windscreen wiper blade with alternating movements sweeping at least a portion of the exterior surface of a window of the vehicle between two positions at which the sweeping direction is reversed;
  a device for spraying a liquid onto the exterior surface;
  a pump for feeding the sprayer device with liquid;
  characterized in that it consists in:
  equipping said drive arm with a windscreen wiper blade including a plurality of orifices for spraying the liquid and connecting this windscreen wiper blade to the feed pump;
  equipping the drive arm or the windscreen wiper blade with an acceleration sensor;
  equipping the vehicle with a circuit for controlling the feeding of the sprayer device by the pump as a function of the sweeping direction, and connecting the control circuit to the acceleration sensor that supplies to the control circuit signals representing the value of the acceleration of the drive arm or of the windscreen wiper blade of the windscreen wiper during the alternating sweeping movements.
  According to other features of the method:
  it consists in equipping the vehicle with a relay for controlling the supply of electrical energy of a drive motor of the feed pump, and connecting this relay to the control circuit;
  it consists in installing the control circuit on the drive arm or the windscreen wiper blade;
  the control circuit is integrated into a microcontroller.

BRIEF DESCRIPTION OF THE FIGURES

Other features and advantages of the invention will appear in the course of reading the following detailed description for an understanding of which reference will be made to the appended drawings in which.

DETAILED DESCRIPTION OF THE FIGURES

In the remainder of the description, elements having an identical structure or analogous functions will be designated by the same references.

Figure 1:
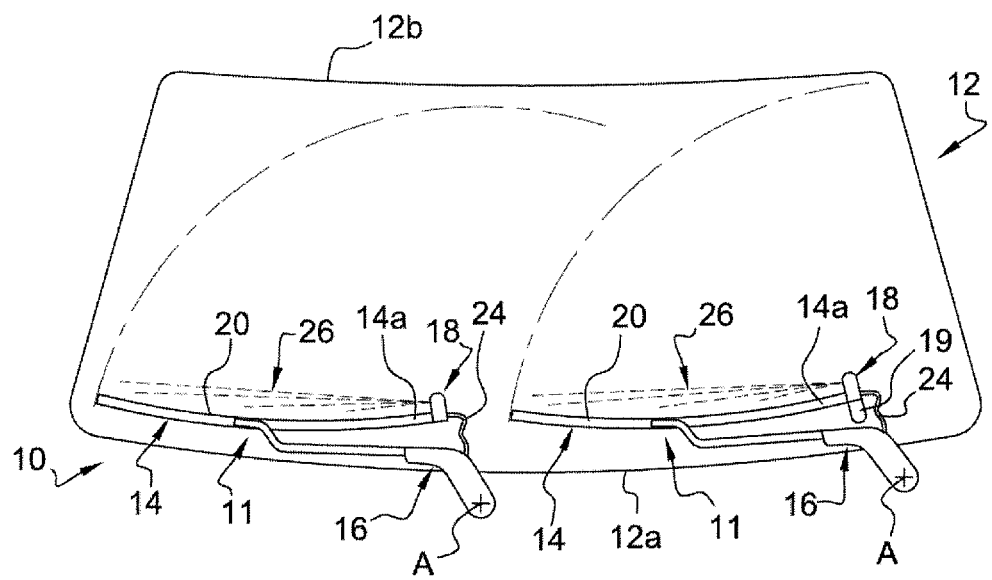
FIG. 1 is a diagrammatic representation of a part of a wiper system in which the windscreen wiper blades are in a bottom rest position.
Figure 2:
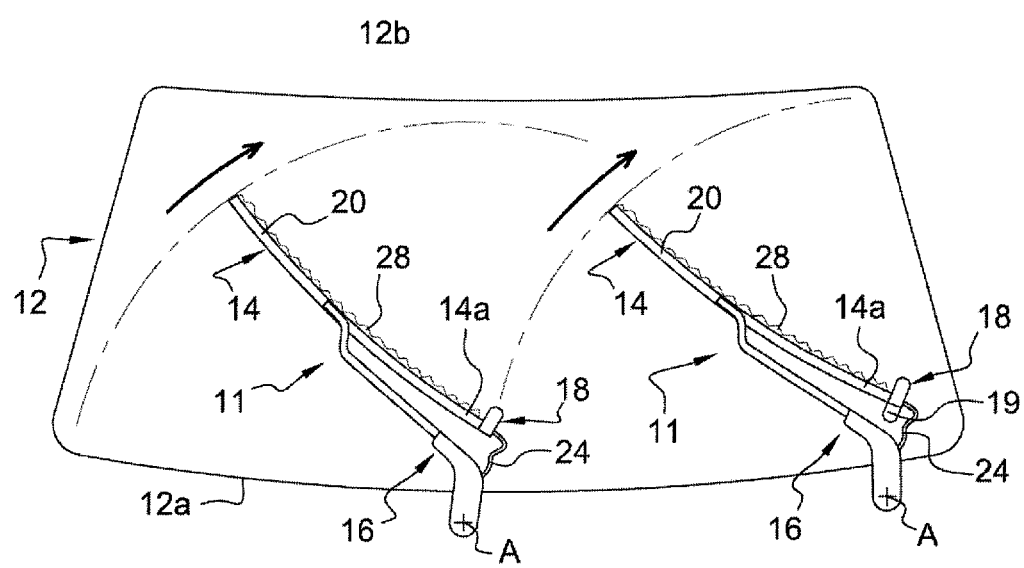
FIG. 2 is a representation similar to that of FIG. 1, showing the windscreen wiper blades during an upward outward wiping phase.

There has been shown diagrammatically in FIGS. 1 and 2 a known general design of a wiper system 10 for a motor vehicle window, for example for the exterior surface of a windscreen 12 of the vehicle.

The wiper system 10, also known as a windscreen wiper blade system, includes two windscreen wipers 11 each including a windscreen wiper blade 14, that are mobile with a sweeping motion relative to the windscreen 12, in such a manner that the windscreen wiper blades 14 wipe two portions of the exterior surface of the windscreen 12 that may be distinct, or partially overlap.

Here each windscreen wiper blade 14 is able to effect alternating sweeping movements.

In the following description, reference will be made to a single windscreen wiper 11 and to a single windscreen wiper blade 14, and it will be understood that this description applies equally to the other windscreen wiper 11.

The windscreen wiper blade 14 is for example a windscreen wiper blade of low height known as a "flat blade" windscreen wiper blade that includes an upper support frame 20 carrying a lower wiper blade that is pressed against the exterior surface of the windscreen 12 and which effects the wiping, notably of water present on the exterior surface, when the windscreen wiper blade 14 is driven in sweeping movements.

In the present case, the windscreen wiper blade 14 is mounted to be mobile in alternating sweeping movements, in alternating pivoting, about an axis A oriented globally orthogonally to the plane of the exterior surface to be wiped, between a low rest position represented in FIG. 1, in which the windscreen wiper blade 14 is substantially parallel to a lower transverse edge 12a of the windscreen 12, and a high extreme wiping position in which the windscreen wiper blade 14 extends across the windscreen 12.

The windscreen wiper blade 14 is driven in pivoting about the axis A by a drive arm 16, also referred to as a windscreen wiper arm, that is mounted to be able to pivot about the axis A relative to a structural element of the vehicle (not shown).

During its alternating sweeping movements movement in two phases, the windscreen wiper blade 14 effects an "outward" or "upward" first phase during which the windscreen wiper blade 14 is moved from its low rest position toward its high extreme position, then a "return" or downward second phase, during which the windscreen wiper blade 14 moves in the opposite direction from its high extreme position towards its low rest position.

The low rest position and the high extreme position are therefore positions at which the sweeping direction is reversed.

The wiper system has been described hereinabove as corresponding to a system in which the two windscreen wiper blades 14 effect an alternating movements sweeping the glazed panel.

A wiper system may also correspond to a system in which the windscreen wiper blades effect non-alternating movements sweeping the exterior surface of the window, or again in which the windscreen wiper blades effect a linear sweeping of that surface. Consequently, it must be understood that the rest position and the extreme position of the windscreen wiper blade may vary as a function of the wiper system chosen.

The wiper system 10 further includes at least one nozzle 18 for spraying a cleaning liquid to complement the wiping by the windscreen wiper blade 14.

Here the nozzle 18 is carried by the windscreen wiper blade 14.

A pipe, or hydraulic conduit, 24 connects the sprayer nozzle 18 to a cleaning liquid feeder device not shown in FIGS. 1 and 2.

By way of nonlimiting example, the nozzle 18 is carried by the windscreen wiper blade 14 and here it is situated at an end 14a of the windscreen wiper blade 14, which is that situated closest to the pivot axis A.

The nozzle 18 is produced and adapted in such a manner that it sprays a liquid in the form of a jet 26 globally oriented parallel to the windscreen wiper blade 14.

Moreover, the sprayed jet 26 is sprayed along the "upstream" lateral face, or side, of the windscreen wiper blade, that is to say the lateral face that is oriented toward an upper edge 12b of the windscreen 12 when the windscreen wiper blade 14 is in the low rest position (see FIG. 1).

The nozzle 18 is for example oriented relative to the windscreen wiper blade 14 in such a manner that the jet 26 of cleaning liquid is sprayed directly along the wiper blade.

This is the lateral face of the blade that is oriented toward the extreme sweeping position of the windscreen wiper blade 14, when the windscreen wiper blade 14 effects the outward first phase of its sweeping movement.

A method of controlling a wiper system 10 of this kind, aims to produce a wiping and washing cycle that includes a plurality of successive steps of wiping and of spraying washing liquid.

Each step of the cycle consists in a to-and-fro movement of the windscreen wiper blade 14 and therefore includes an outward first phase and a return second phase of the windscreen wiper blade 14, as defined previously.

A liquid spraying step consists in spraying of the liquid by the nozzle 18. The liquid jet 26 is formed during a predetermined duration, in such a manner as to spray a certain quantity of liquid along the wiper blade of the windscreen wiper blade 14.

Figure 3:
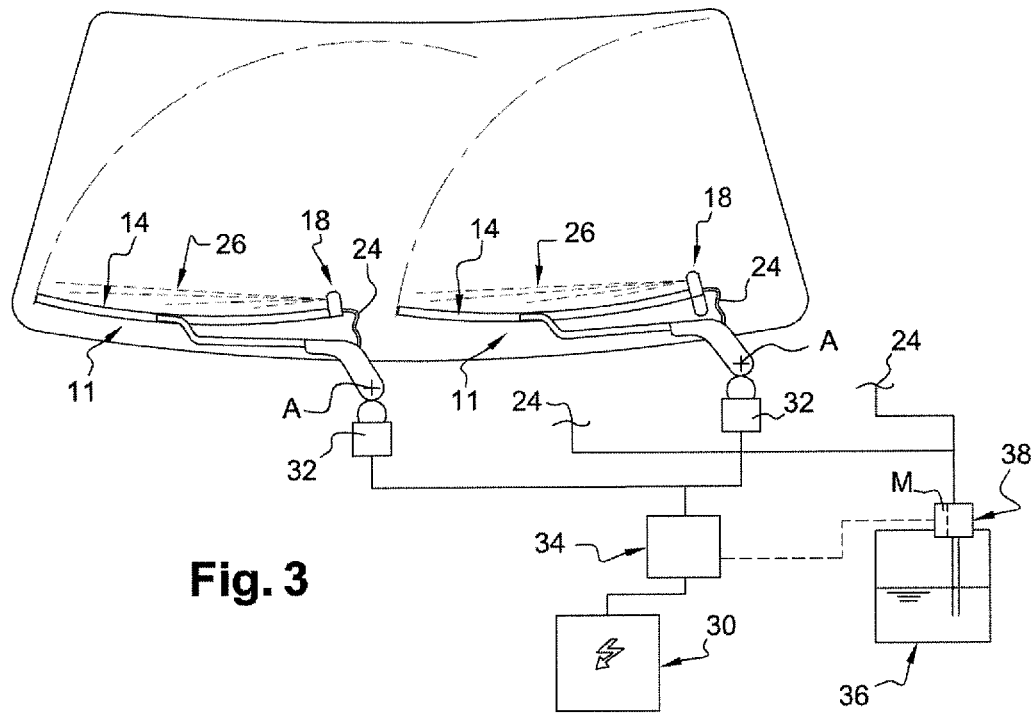
FIG. 3 is a diagrammatic representation of the elements shown in FIG. 1 in association with complementary components for driving the windscreen wiper blades and for spraying window washing liquid.

There have been represented in FIG. 3 the components and elements of the wiper system 10 shown in FIG. 1 in association with supplementary elements and components for the motorized driving of the windscreen wiper blades 14 and the supply of the pipes 24 connected to the spray nozzles 18 with washing liquid under pressure.

There has notably been represented an electrical power supply 30 that is for example a battery of the vehicle.

There has been represented in diagrammatic manner an alternating sweeping movements drive electric motor 32 associated with each drive arm 16 the supply of power to which and the control of which are performed by a control electronic circuit 34.

Alternatively, it is possible to provide a single drive motor 32 common to the two windscreen wipers 11 and that is connected to one or both drive arms 16 for example by a linkage.

There has been represented a reservoir 36 of window washing liquid from which an electric pump 38, termed a window washer pump, draws.

The supply of electrical current to the electric motor M driving the window washer pump 38 and control thereof are performed by the control electronic circuit 34.

Discharge outlets of the window washer pump 38 are connected to the pipes 24.

Accordingly, when the motor M is supplied with electric current, the pump discharges and the sprayer nozzles 18 are fed with window washing liquid under pressure supplied by the window washer pump 38.

By operating the window washer pump 38 accordingly, the washing liquid spraying step may begin during the rest phase, or begin on the starting of the upward outward phase.

The spraying step will extend through all or part of the first upward outward phase of the windscreen wiper blade 14 during which the liquid sprayed onto the exterior surface of the windscreen 12 is immediately scraped and wiped.

On the other hand, notably because visibility is then degraded, it is not desirable for the spraying step to be extended, or to take place, during all or part of the downward return phase of the windscreen wiper blade 14.

In fact, in a situation of this kind, the window washing liquid is sprayed "over" the windscreen wiper blade 14 directly onto the exterior surface of the windscreen 12 that is entirely sprayed with it, but this liquid is not scraped, or wiped by the windscreen wiper blade which is in the downward return phase.

It is therefore desirable to limit each spraying step essentially to one or more consecutive upward outward phases, by interrupting, or by not starting, spraying of washing liquid when the windscreen wiper blades are in the sweeping downward return phase.

To produce this kind of operation, the invention proposes to detect the consecutive upward outward phases and downward return phases, and thus to detect the reversing of the sweeping direction by analysing the variations of the acceleration of the windscreen wiper blade during its alternating sweeping movements.

Figure 7:
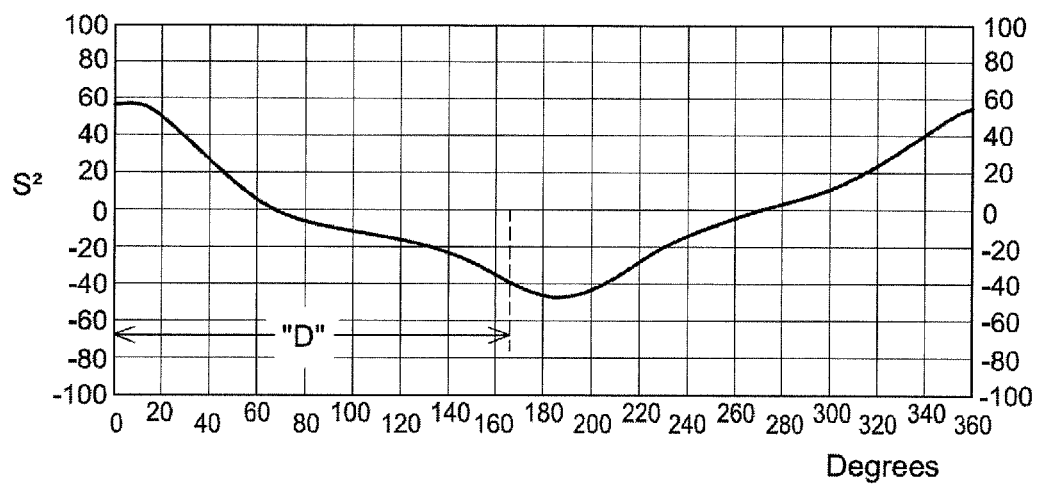
FIGS. 7 and 8 are two diagrams respectively showing the variation of the acceleration and of the speed of a windscreen wiper blade as a function of its angular position during a to-and-fro wiping cycle.
Figure 8:
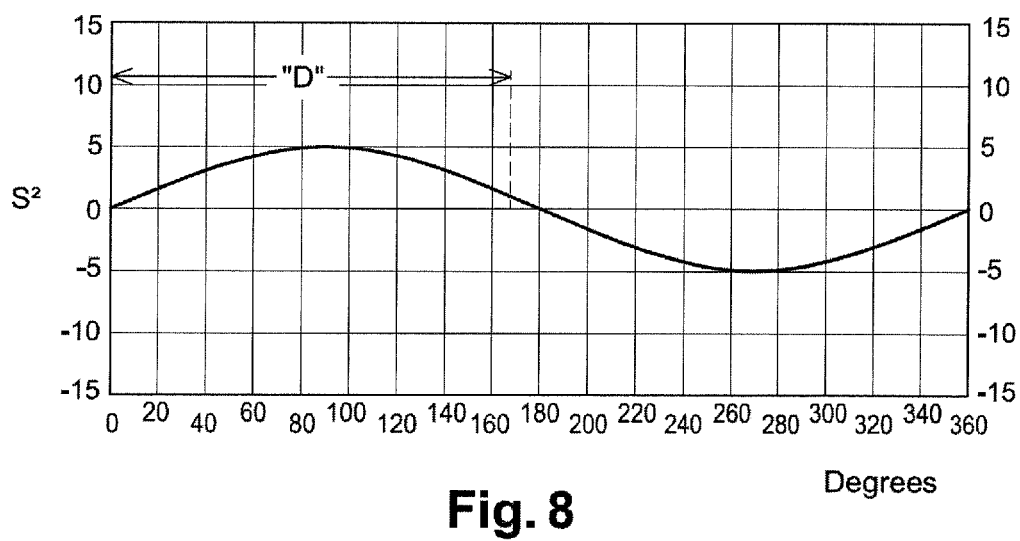

In fact, as shown in the FIGS. 7 and 8 diagrams, during a wiping cycle with two consecutive phases, the speed starts from zero and then increases—by convention of positive value during the upward outward phase—and then decreases to reach zero again at the high extreme position, after which it is reversed to assume an increasing negative value and then again decreasing negative value reaching zero at the low extreme position, and so on.

These variations and reversings of speeds shown in FIG. 8 are associated with variations of acceleration shown in FIG. 7.

To detect these variations, the invention proposes to equip at least one windscreen wiper 11 with an acceleration sensor CA that supplies a signal representing the instantaneous acceleration of the windscreen wiper 11.

Figure 4:
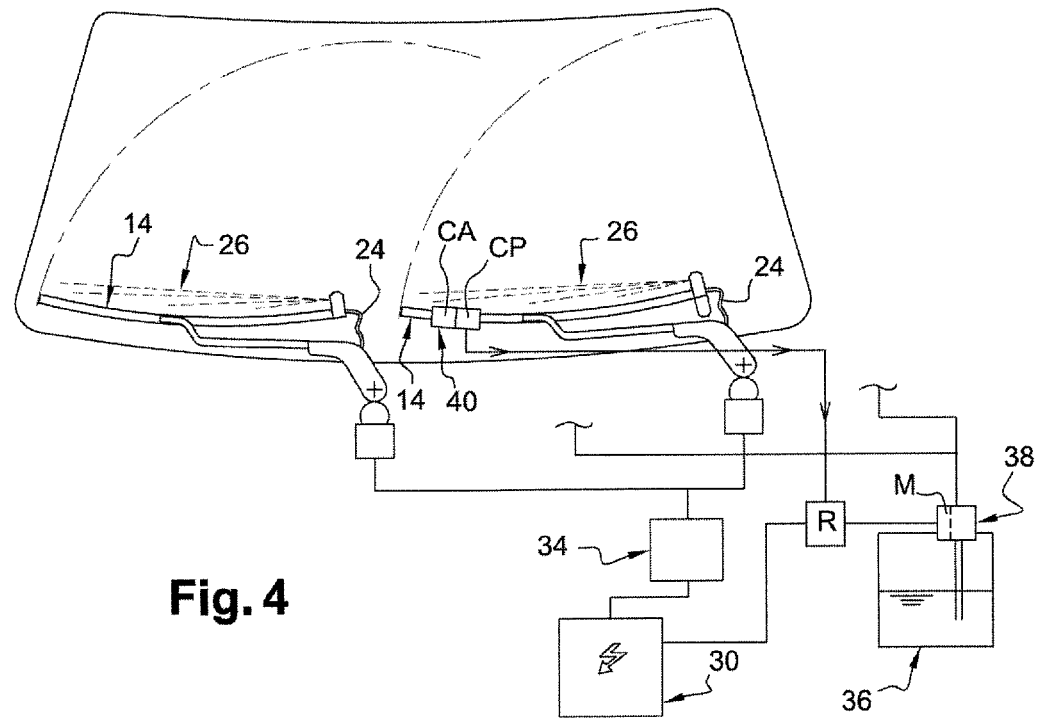
FIG. 4 is a representation similar to that of FIG. 3 showing a wiper system employing the teachings of the invention.

This is shown diagrammatically in FIG. 4 in which there has been represented a module 40 that is fixed to the windscreen wiper blade 14 and which houses an acceleration sensor CA such as an accelerometer and/or a gyroscope.

The module 40 is connected to the electrical power supply 30 and the acceleration sensor CA is connected as shown diagrammatically to a relay R for controlling the supply of electrical power to the motor M of the window washer pump 38.

Here the module 40 also integrates a circuit CP for controlling the supply of electrical current to the window washer pump 38.

Accordingly, the control circuit, which is for example an "Arduino" type microcontroller, receives signals from the acceleration sensor CA that it analyses to deduce therefrom the upward or downward direction of the windscreen wiper blade 14 and therefore of the windscreen wiper 11, to control the relay R in order for the latter not to supply power to the motor M of the window washer pump 38 except during the upward outward phases, and to interrupt the latter during downward return phases.

This control is independent of the action exerted by the driver on the control member available to them in the passenger compartment to bring about spraying of the windscreen, and for example independent of any prolonged action on the control comodo.

As is diagrammatically represented in FIGS. 7 and 8, the duration "D" of the supply of power may be less than the duration of the upward outward phase in order to prevent the occurrence of the phenomenon known as "water pull back" by guaranteeing that all the liquid sprayed has indeed been wiped and evacuated from the surface in the upward phase.

By way of variants, not shown:
the acceleration sensor may be carried by the drive arm 16;
each windscreen wiper 11 may be equipped with an acceleration sensor if the two wipers are not synchronized and necessitate independent control of the sprayer devices;
the control circuit may be independent of the acceleration sensor and for example be onboard the vehicle, and notably integrated into the control electronic circuit 34 to control the supply of electrical power to the window washer pump 38, with a wire or radio-frequency connection connecting the control circuit to the acceleration sensor;
each sprayer device may be of any design adapted to spray the window washing liquid onto a particular zone of the exterior surface of the windscreen;
each sprayer device, for example in the form of a sprayer nozzle 18, may be carried by the windscreen wiper 11 (by the windscreen wiper blade 14 or by the drive arm), or be installed on a fixed part of the vehicle.

Figure 5:
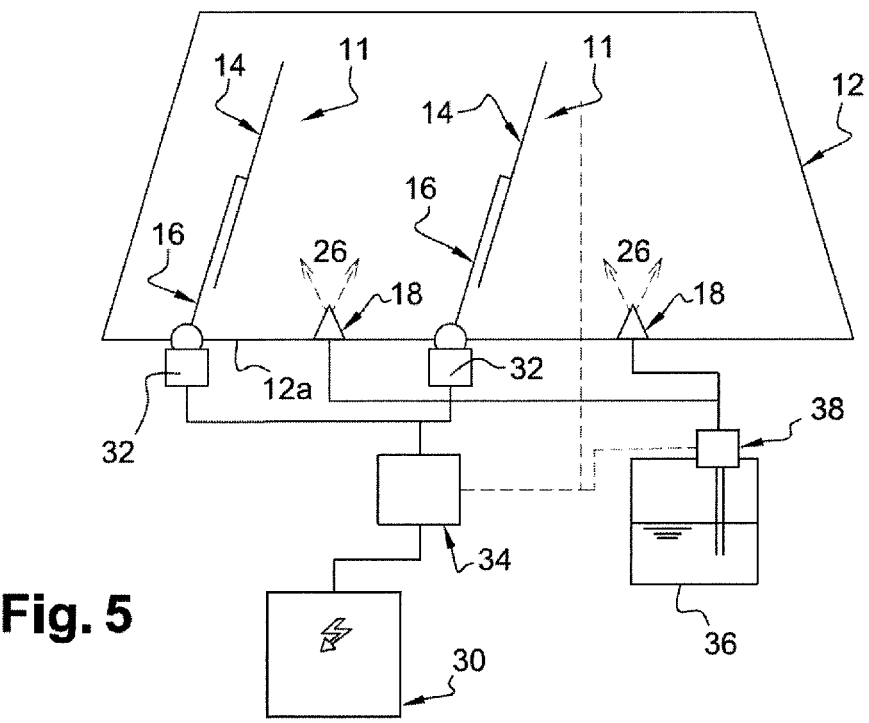
FIG. 5 is a representation similar to that of FIG. 4 showing another windscreen wiper blade system design.

There has been represented in FIG. 5 a wiper system 10 analogous to that shown in FIG. 3 from which it essentially differs in known manner by the sprayer nozzles 18 being installed on a fixed part of the vehicle, for example at the bottom of the windscreen 12, or on the bonnet.

Figure 6:
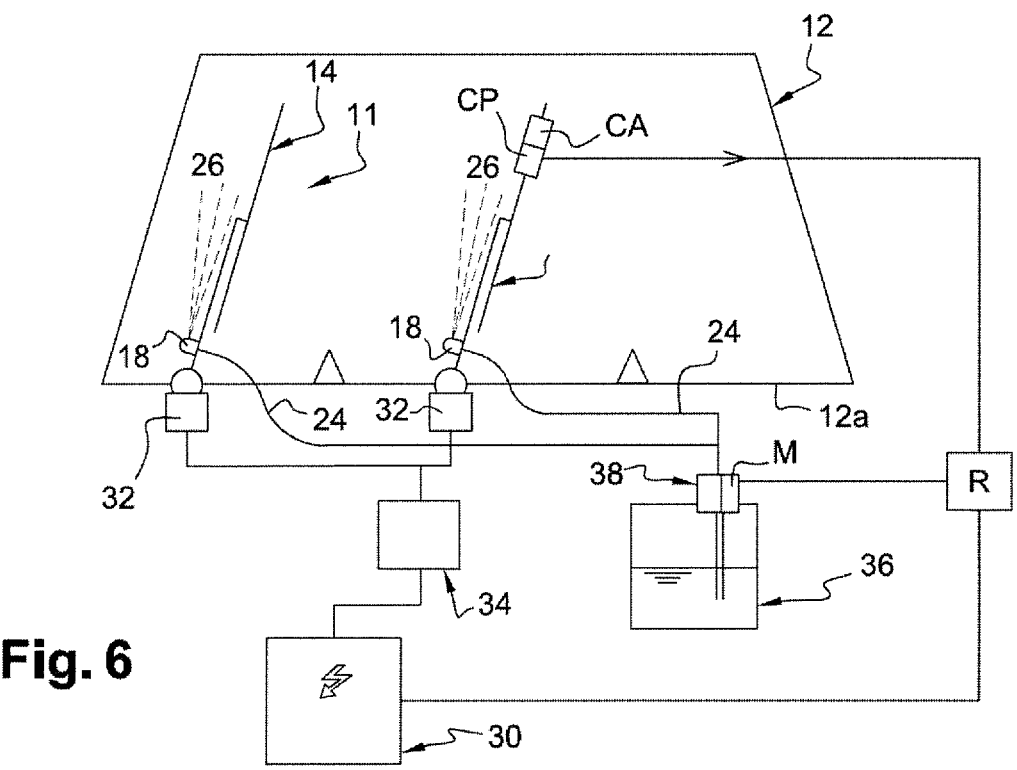
FIG. 6 is a representation similar to that of FIG. 5 showing the modified wiper system according to the invention.

As shown diagrammatically in FIG. 6, it is possible to modify the design and the installation of a wiper system of this kind to implement the teachings of the invention calling on control of the spraying of liquid by means of an acceleration sensor CA and an associated control circuit CP.

To this end, it is necessary to replace each windscreen wiper blade in order to equip each drive arm with a windscreen wiper blade 14 including for example a sprayer nozzle 18 with a plurality of orifices for spraying the liquid and to connect a windscreen wiper blade 14 of this kind to the window washer pump 38 for example by means of the pipes 24 that previously fed the "fixed" sprayer nozzles 18 (FIG. 5).

As in the case of the wiper system shown in FIG. 4, a windscreen wiper blade 14, or a drive arm 16, is equipped with an acceleration sensor CA.

The vehicle is also equipped with a circuit CP for controlling the feeding of the sprayer device by the pump as a function of the sweeping direction, which is connected to the acceleration sensor CA that supplies to the control circuit signals representing the value of the acceleration of the drive arm or of the windscreen wiper blade of the windscreen wiper during the alternating sweeping movements.

The acceleration sensor CA and the control circuit PC may also be integrated into a common module 40.

As previously, the vehicle is equipped with a relay R for controlling the supply of electrical energy to the drive motor M of the window washer pump 38, and for connecting this relay to the control circuit CP.

The invention claimed is:

1. A wiper system for wiping a vehicle window, comprising:
   at least one windscreen wiper blade adapted to be driven by a drive arm of the wiper system with alternating movements sweeping at least one portion of an exterior surface of a window to be wiped between two positions at which a sweeping direction is reversed;
   a sprayer device for spraying a liquid onto the exterior surface;
   a pump for feeding the sprayer device with liquid;
   a circuit for controlling the feeding of the sprayer device by the pump as a function of the sweeping direction; and
   an acceleration sensor of a windscreen wiper,
   wherein the windscreen wiper includes the at least one windscreen wiper blade and the drive arm, and
   wherein the acceleration sensor is carried by the drive arm or by the windscreen wiper blade and is connected to the control circuit in order to supply to the control circuit signals representing the value of the acceleration of the drive arm or of the windscreen wiper blade of the windscreen wiper during the alternating sweeping movements.

2. The wiper system according to claim 1, wherein the control circuit includes means for analysis of the signals supplied by the acceleration sensor to detect the reversing of the sweeping direction of the windscreen wiper.

3. The wiper system according to claim 1, wherein the sprayer device is configured to spray liquid along a lateral face of the at least one windscreen wiper blade.

4. The wiper system according to claim 3, wherein the sprayer device is carried by the at least one windscreen wiper blade or by the drive arm.

5. The wiper system according to claim 1, wherein the control circuit is carried by the at least one windscreen wiper blade or by the drive arm, and the sprayer device is configured to spray the windscreen along a lateral face of the wiper.

6. The wiper system according to claim 1, wherein the feed pump is controlled by the control circuit.

7. The wiper system according to claim 1, further comprising a relay for controlling the supply of electrical energy to a drive motor of the feed pump connected to the control circuit.

8. A windscreen wiper of a motor vehicle window, comprising:
   an acceleration sensor of the windscreen wiper; and
   a circuit for controlling feeding of a sprayer device for spraying liquid onto the motor vehicle window with liquid,
   wherein the acceleration sensor is connected to the control circuit and carried by the windscreen wiper.

9. The windscreen wiper according to claim 8, further comprising a windscreen wiper blade and an arm for driving alternating sweeping movements of the windscreen wiper blade, wherein the acceleration sensor and the control circuit are carried by the windscreen wiper blade.

10. The windscreen wiper according to claim 9, wherein the sprayer device is carried by the windscreen wiper blade.

11. A motor vehicle windscreen wiper blade comprising:
    an acceleration sensor configured to measure an acceleration of the windscreen wiper blade;
    a circuit for controlling feeding of a sprayer device for spraying liquid onto a window of a motor vehicle windscreen with liquid,
    wherein the acceleration sensor is connected to the control circuit and carried by the windscreen wiper blade.

12. The windscreen wiper blade according to claim 11, wherein the sprayer device is carried by the windscreen wiper blade.

* * * * *